Feb. 20, 1962        B. ROSS        3,021,754
LIGHT POLARIZING APPARATUS OR THE LIKE
Filed Sept. 26, 1956        3 Sheets-Sheet 1
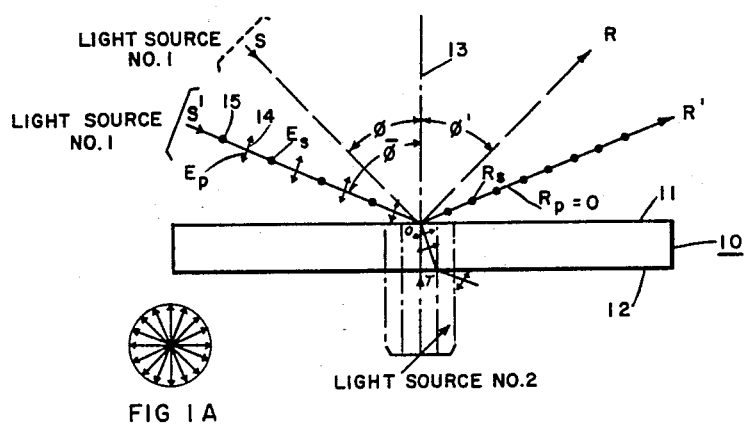
FIG 1A
FIG 1
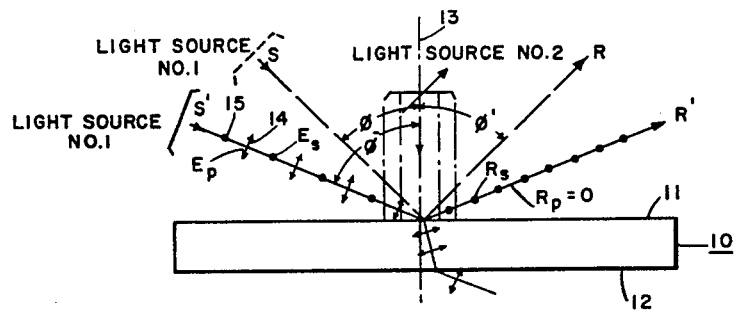
FIG 2
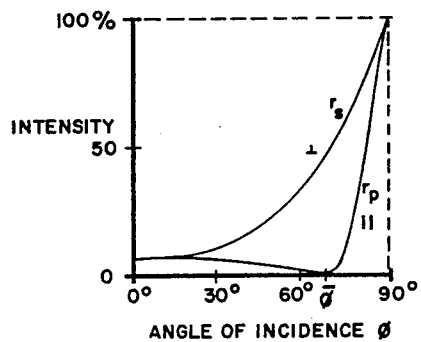
FIG 3
BERND ROSS
*INVENTOR.*
BY
HIS ATTORNEY Feb. 20, 1962    B. ROSS    3,021,754
LIGHT POLARIZING APPARATUS OR THE LIKE
Filed Sept. 26, 1956    3 Sheets-Sheet 3

BERND ROSS
*INVENTOR.*

BY

HIS ATTORNEY

_United States Patent Office_

3,021,754
Patented Feb. 20, 1962

3,021,754
LIGHT POLARIZING APPARATUS OR THE LIKE
Bernd Ross, Chicago, Ill., assignor to Hoffman Electronics Corporation, a corporation of California
Filed Sept. 26, 1956, Ser. No. 612,272
3 Claims. (Cl. 88—61)

This invention is related to apparatus suitable for polarizing light energy and, more particularly, to new and improved light polarizing apparatus in which the degree of polarization and/or amplitude of emergent rays may be modulated electrically or by other energy means.

In the past, there have been many devices for polarizing light. Frequently such devices are designed for modulating the degree of polarization and/or amplitude of an emergent beam of light. Means conventionally employed for modulating the polarization of a given light beam or ray are either mechanical or electrical. Mechanical or physical variation of polarization may of course be obtained by rotating crossed calcite crystals, by use of artificial light-polarizing films or plates, such as light polarizing sheets, by the use of a Nicol prism, or by prism rotation where the incident beam is inclined by an angle of incidence relative to the optical axis thereof. Modulation of the polarization of light by mechanical means is of course unusually slow and cumbersome, involving as it does the use of an elaborate optical bench well equipped with optical devices. And, of course, such modulation of polarization as might be obtainable by physical means of a mechanical nature will be of unusually slow characteristics. One type of electrical means for varying the polarization and/or amplitude of light is that incorporating two sheets of light polarizing material and in combination therewith a Kerr cell. This combination is very effective for varying the amplitude of emergent light. Indeed, the Kerr cell alone is highly effective in changing the plane of polarization of incident plane polarized light. The Kerr cell principle, however, is highly restricted in use and in results obtained, and of course necessitates the employment of high voltage equipment which must generate thousands of volts for appropriate Kerr cell operation. It will of course be highly desirable if there might be devised electrical or electronic means, or other energy source means, and in combination therewith a simple device for producing substantially all types and degrees of polarization of light, and this with the employment of low voltage electrical means, if such means need be employed at all.

Therefore, it is an object of the present invention to provide new and useful light polarizing apparatus.

It is a further object of the present invention to provide new and useful light polarizing apparatus which will be highly versatile and yet extremely inexpensive to manufacture.

It is an additional object of the present invention to provide new and useful light polarizing apparatus which is capable of polarizing incident light in innumerable ways and degrees, and of enabling the high or low frequency modulation thereof, and this with but simple and inexpensive apparatus.

According to the present invention, the basic and novel principle employed is that the dielectric constants of appropriate materials may be varied by the injection of energy whether such energy be in the form of light, in the form of electrical current, or in the form of by-products resulting from excitation of such material. In a preferred embodiment of the invention, material conventionally having dielectric properties is adapted for transformation, by appropriate means, into material having metallic optical properties. These properties may be enhanced or diminished by the modulated production or diminution of free charge carriers within the material itself. By such a technique employed in suitable apparatus, one may obtain in selectably variable degree all types of desired polarization as one may choose, such as circular polarization, elliptical polarization, or plane polarization, for example. Furthermore, the degree of polarization, the eccentricity, and the amplitude are all likewise controllable. Again, these novel effects are produced by varying the dielectric constant or metallic property of the reflective surfaced material employed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 represents a first embodiment of the present invention.

FIGURE 1A is a diagrammatic representation of a view looking against or into a ray of unpolarized light.

FIGURE 2 is a second embodiment of the present invention slightly different in configuration but similar in operation to the apparatus of FIGURE 1.

Figure 4:
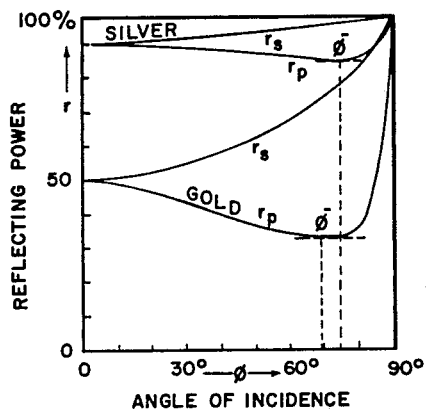
Figure 5:
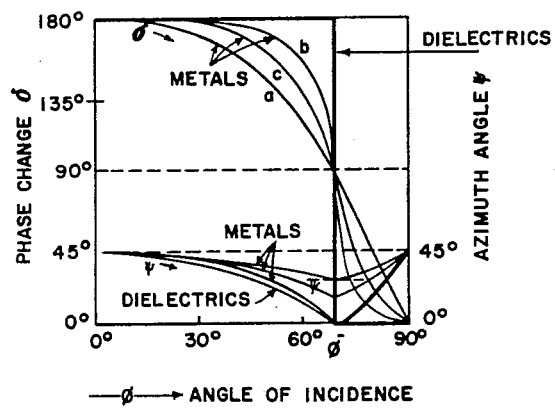

FIGURES 3, 4, and 5 are graphs of phenomena which shall be hereinafter explained.

Figure 6:
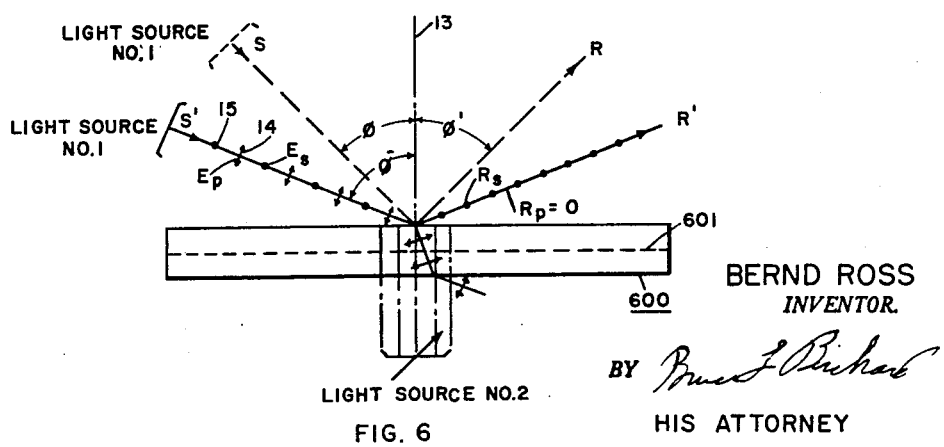

FIGURE 6 is an additional embodiment of the present invention similar to the embodiment shown in FIGURES 1 and 2, but incorporating within the reflective member thereof a p-n junction so as to achieve multiplied minority carrier production.

Figure 7:
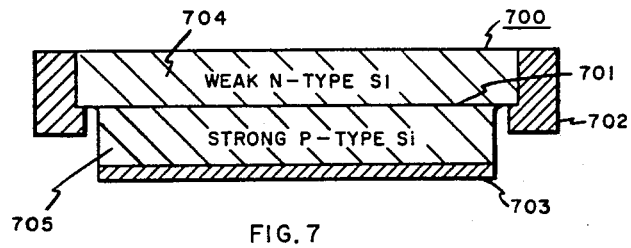
Figure 8:
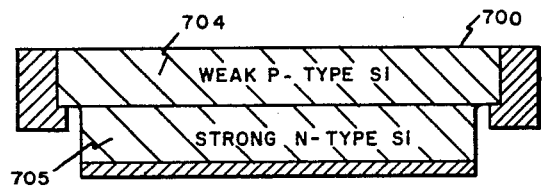

The devices shown in FIGURES 7 and 8 are similar to the device of FIGURE 6, but incorporate electrodes or electrical terminals suitable for connection to an external voltage source.

Figure 9:
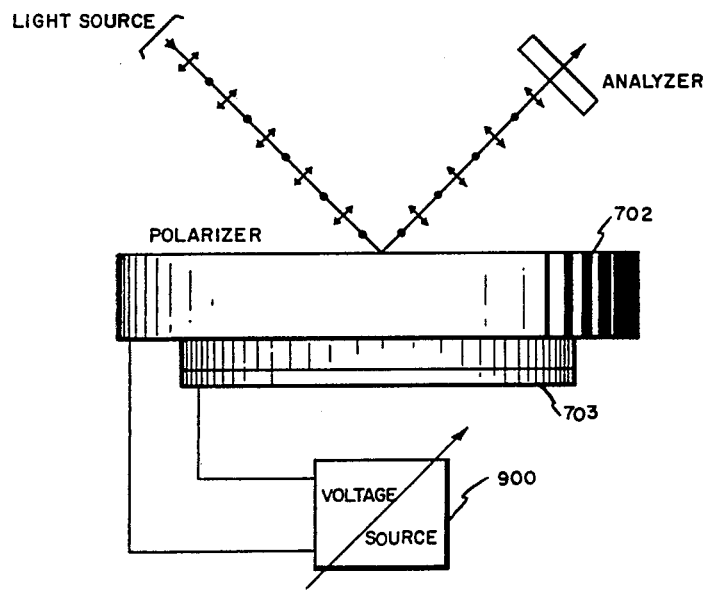

The apparatus of FIGURE 9 incorporates the semiconductor device shown in either FIGURE 7 or FIGURE 8 and includes therewith a connected voltage or signal source and also an analyzer device, if desired.

In FIGURE 1, dielectric 10 is provided having upper surface 11 and lower surface 12. Upper surface 11 is preferably ground and polished so that the surface may exhibit a relatively high index of reflectivity. Axis 13 is disposed normally to upper surface 11 of dielectric 10 and passes therethrough. Assume now that there is disposed above upper surface 11 of dielectric 10 a light source No. 1 emitting a ray of light SO which is incident to upper surface 11 at an angle of incidence $\phi$ with respect to axis 13. Accordingly, there will be a reflected ray OR produced having an angle of reflection, with respect to axis 13, of $\phi'$. If we assume that the light emanating from light source No. 1 is in an unpolarized condition, then reflected ray OR will be partially plane polarized in a direction perpendicular to the plane of incidence, that is, to the plane including axis 13 and incident light ray SO.

Now suppose that light source No. 1 is translated from position S to position S', at which the angle of incidence of the incident ray S'O will equal the polarizing angle or Brewster's angle $\overline{\phi}$. In such event, there will be a reflected ray OR' which will be completely plane polarized in a direction perpendicular to the plane of incidence including axis 13 and incident light ray S'O. Additionally, there will be also a refracted ray OT the direction of which will be 90° removed (at Brewster's angle $\overline{\phi}$) from the direction of reflected, plane-polarized ray OR'. Again, if we assume that the light emitted by light source No. 1 is in an unpolarized condition, an end view diagram of the vibrations of the electric vector of the incident light ray will be represented by FIGURE 1A. The electric vector plurality of FIGURE 1A may be represented by two electric vectors 90° removed, with the amplitudes of these two electric vectors equaling the summation of the component values of the vectors shown in FIGURE 1A. This electric vector resolution is indicated in FIGURE 1 by the arrows 14, which are perpendicular to the direction of the incident light ray and which also lie in the plane of incidence including the light ray and axis 13, and also the dots 15 which represent arrows of a transverse character which are disposed normally to the plane of incidence. It will be appropriate to term the maximum amplitude of the electric vector 14 (lying in the plane of incidence) as $E_p$ ($p$ standing for parallel vibrations to the plane of incidence). It will also be appropriate to designate electric vector vibrations which are normal to the plane of incidence with a maximum amplitude of $E_s$ ($s$ standing for the German word senkrecht, meaning "perpendicular"). By similar reasoning, the maximum amplitude of electric vector vibrations of the reflected ray which lie in or are parallel to the plane of incidence may be termed $R_p$, whereas the maximum amplitude of the electric vector vibrations of the reflected ray which lie perpendicularly to the plane of incidence may be designated as $R_s$. With the above designations, we may define the reflecting powers (relative intensity indicia) $r_s$ and $r_p$ of the two reflected electric vectors of the reflected ray as follows:

(1) $$r_s = \frac{R_s^2}{E_s^2} \text{ and } r_p = \frac{R_p^2}{E_p^2}$$

The relative intensities $r_s$ and $r_p$ may be plotted for variable angles of incidence, and, in the case where the index refraction ($n$) equals 1.50, the curves will appear as shown in FIGURE 3. It is to be noted that intensity $r_p$ of light vibrations lying in the plane of incidence and reflection of the reflected ray reduces to zero when the angle of incidence (and of reflection) equals Brewster's angle $\bar{\phi}$ for the dielectric. The curves shown in FIGURE 3 were first determined theoretically by Fresnel, utilizing the elastic solid theory of light. These results were later proven by experiment and in recent times have been confirmed by the electromagnetic wave theory of light.

Hence, by employing an analyzer such as a Nicol prism or a simple light-polarizing sheet or lens with the plane of polarization parallel to $R_s$ vibrations, i.e., perpendicular to the plane of incidence, one may derive completely plane polarized light exhibiting a varying intensity for different angles of incidence of the incident light relative to the dielectric and the normal axis thereof. Or, if one desires, he may obtain directly from the dielectric and without the use of an analyzer an emergent ray having a varying degree of polarization and total amplitude for varying angles of incidence $\phi$. If we assume that light emanating from the light source is unpolarized, then it will follow that neither circularly polarized light nor elliptically polarized light can be achieved by simply reflecting light from a dielectric surface. This follows from Fresnel's celebrated equations (2) $$\frac{R_s}{E_s} = \frac{-\sin(\phi-\phi')}{\sin(\phi+\phi')} \text{ and } \frac{R_p}{E_p} = \frac{\tan(\phi-\phi')}{\tan(\phi+\phi')}$$

where $\phi'$ is the angle of refraction.

The phase change between $E_s$ and $R_s$ will always be 180° for all angles of incidence, whereas the phase change between $E_p$ and $R_p$ will be zero for all angles of incidence less than Brewster's angle, and will be 180° for all angles of incidence greater than Brewster's angle. Thus, even neglecting the random phase nature of the incident ray, the two components of the reflected ray will either be 0° or 180° removed in phase so that by plotting sinusoidally the two waves the Lissajous figure resulting will be a straight line, varying in azimuth with the angle of incidence of the incident ray.

The pictorial representation and operation of the dielectric and the incident light ray thereon is identical in both FIGURE 1 and FIGURE 2. It is to be noted that we have not thus far described the purpose and operation of light source No. 2 in FIGURES 1 and 2. It may be noted at the outset that the light source may be either below the dielectric, as is shown in FIGURE 1, or above the dielectric as is shown in FIGURE 2. It is recalled from the electromagnetic theory pertaining to light and dielectrics that the presence of free charge carriers in a dielectric (or at or near the reflecting surface thereof in the case of a material having a high co-efficient of absorption) will have appreciable effect upon the character of light, particularly that of the plane polarized variety as is reflected from the surface of a reflecting material. Now in dielectric materials, the electrons are bound to the atoms and are free only to oscillate about centers of force. In the case of metals, many of the electrons are free to move through their respective substance under the action of an electric field. This has been found to hold true by the inventor in the case of charge carriers injected in a dielectric material, as for example by photon impingement by the light rays from light source No. 2 in either FIGURE 1 or FIGURE 2 upon the reflecting surface of dielectric 10, which action will cause the production of minority carriers of the free charge variety within the dielectric itself. By varying the intensity of the incident light from light source No. 2 as such light impinges upon lower surface 12 of dielectric 10, for example, we may also vary the quantity of free charge minority carriers within the dielectric material. This unique phenomenon constitutes a principal basis of the present invention. It is at once seen that the dielectric coefficient of the material may be altered by varying the amplitude of the light source (light source No. 2). Hence, by increasing the intensity of the light source No. 2, one may produce effects of a more metallic reflecting nature with but the sole employment of dielectric 10.

The significance of the curves shown in FIGURE 4 should now be considered. FIGURE 4 illustrates the $r_s$ and $r_p$ intensity curves for silver and gold reflectors with surfaces having a high index of reflectivity. It is to be noted that these curves are similar to those of FIGURE 3, but with the exception that the initial ordinate values are greatly increased. Thus, it is clearly seen that the initial reflecting power of metals having free electrons is much greater than the reflecting power of dielectrics whose charge carriers are bound. The cruves for silver are at the upper portion of the graph in FIGURE 4, and are rightly so placed because silver is a better conductor of electricity than is gold. Early experiments indicate the possibility that the reflecting power ordinate of a dielectric material such as silicon or germanium may be varied greatly and measurably increased in a region approaching the silver region by increasing the light intensity from light source No. 2 upon the dielectric, as is shown in both FIGURE 1 and FIGURE 2. Thus, the electrical character of dielectric 10 may be materially changed to that approaching the character of highly conductive metals.

It will be well to recall the equations for the reflecting powers of metallic substances.

(3) $$r_p = \frac{R_p^2}{E_p^2} = \frac{\left(n - \frac{1}{\cos\phi}\right)^2 + K_0^2}{\left(n + \frac{1}{\cos\phi}\right)^2 + K_0^2}$$

$$r_s = \frac{R_s^2}{E_s^2} = \frac{(n-\cos\phi)^2 + K_0^2}{(n+\cos\phi)^2 + K_0^2}$$

where $n$ is the refractive index and $K_0$ is the extinction co-efficient (equalling $$\frac{\alpha\lambda}{4}$$

there $\alpha$ is the index of absorption and $\lambda$ is wavelength). (It will be recalled that even metals have indices of refraction, even though the extinction co-efficient and the index of absorption may be quite high.) From the above equations it can be shown that incident light vibrating in a plane parallel to the plane of incidence and incident light vibrating in a plane perpendicular to the plane of incidence will both undergo a phase change upon reflection from a metallic surface or a surface acting as such, and that these phase changes may be defined by the following set of equations:

$$(4) \quad \tan \delta_p = \frac{-2b \cos \phi (a^2 + b^2 - \sin^2 \phi)}{a^2 + b^2 - n^4(1 + K^2)^2 \cos^2 \phi}$$

$$\tan \delta_s = \frac{-2b \cos \phi}{a^2 + b^2 - \cos^2 \phi}$$

where $$a^2 = \tfrac{1}{2}\{[(n^2(1-K^2) - \sin^2 \phi) + 4n^4 K^2]^{\frac{1}{2}} + n^2(1-K^2) + \sin^2 \phi\}$$

$$b^2 = \tfrac{1}{2}\{[(n^2(1-K^2) - \sin^2 \phi)^2 + 4n^4 K^2]^{\frac{1}{2}} - n^2(1-K^2) + \sin^2 \phi\}$$

$\delta$ = phase change, and $$K = \text{absorption index} = \frac{K_0}{n}$$

Now the phase change of each of the two electric vectors perpendicular to each other is not so important as is the difference in phase $\delta$. The phase difference $\delta$ is defined as follows:

$$(5) \quad \delta = \delta_p - \delta_s + 360°$$

A difference in phase $\delta$ may be determined on a theoretical basis with respect to increasing angles of incidence for several types of metals in using their representative indices of refraction and absorption. Comparison may also be made to the normal phenomenon involving dielectric use. Reference is now made to the diagrammatic representation illustrated in FIGURE 5 wherein phase change is plotted against angle of incidence. The additional concept of reflected azimuth angle $\psi$ is also plotted against angle of incidence. The graph in FIGURE 5 assumes that the incident light is plane polarized at an azimuth of 45° (so that the maximum amplitudes of the parallel and perpendicular components of the electric vector will be equivalent). The azimuth angle $\psi$ is defined by the following equation:

$$(6) \quad \tan \psi = \frac{R_p}{R_s}$$

The particular value of $\psi$ when the angle of incidence of the plane polarized ray equals the polarizing angle is called the principal azimuth. This angle is of special importance experimentally because the principal azimuth and the polarizing angle are employed in determining the optical constants $n$ and $K$.

Turning back to FIGURE 5, it will be seen that circular polarization of various amplitudes together with elliptical polarization of chosen eccentricity may be obtained by the apparatus of FIGURE 1 and FIGURE 2 by merely changing the "metallic character" of dielectric 10 by means of light injection from light source No. 2. For example, assume that the disposition of light source No. 1 is adjustable so that, provided it is emitting plane polarized light, the plane of polarization of the incident light itself may be adjusted so as to produce a reflected ray exhibiting an electric vector having equal $R_s$ and $R_p$ components. It follows with reference to FIGURE 2 that any phase change between 0° and 180° may be obtained by adjusting the angle of incidence of light source No. 1 with respect to dielectric 10 in FIGURES 1 and 2. It will be recalled that circular polarization may be obtained by "mixing" two plane polarized light rays (polarized in planes normal to each other) when the phase difference between the rays is any odd multiple of $$\frac{\pi}{2}$$

Thus, with reference to FIGURE 5, a phase change of 90° transpires when the angle of incidence equals the polarizing angle $\overline{\phi}$. From FIGURE 5 it is clearly seen that, provided $R_p$ and $R_s$ are equivalent, all metals will produce circularly polarized light when the incident ray has an angle of incidence equal to the polarizing angle. This is not true for dielectrics since at the polarizing angle a discontinuity exists in the phase change $\delta$, i.e., from 180° to 0°. The curves $b$, $c$ and $d$ in FIGURE 5 illustrate that for metals all degrees of elliptical polarization may be obtained, since the phase change $\delta$ is a continuous function of the angle of incidence $\phi$. Note, again, that the phase change $\delta$ for dielectrics exhibits a discontinuity at the polarizing angle so that at angles of incidence below the angle of polarization the phase change is 180°, whereas at angles of incidence above the polarizing angle the phase change is 0°. Hence, neither elliptical nor circular polarization may be achieved in the case of dielectrics even when the angle of incidence is removed from the polarizing angle since the odd multiple of $$\frac{\pi}{2}$$

requirement is not met. Metals, however, as have been heretofore mentioned, will produce circular, elliptical, and plane polarization of type and degree desired.

Thus, there may be achieved both plane and elliptical polarization of the reflected ray, of type and degree desired, by virtue of adjusting and changing the intensity of the light emitted from light source No. 2 in FIGURES 1 and 2 so as to vary the concentration of the free charge minority carriers in dielectric 10 in the figures. What is achieved, therefore, by the apparatus of FIGURES 1 and 2 is a means of modulating light to be reflected, such modulation producing changes in amplitude or changes in type of polarization, or both, depending upon the nature of the reflected light desired.

The above described phenomenon can be made increasingly predominant as, for example, by providing a dielectric 600 exhibiting an exceedingly small thickness and having or exhibiting a p-n junction 601. In such a case, the photon energy from light source No. 2 will impinge upon the p-n junction 601 to produce hole-electron pairs so as to increase minority carrier concentration.

An additional approach is indicated in the apparatus of FIGURES 7 and 8. FIGURE 7 illustrates a semiconductor device 700 exhibiting p-n junction 701 and ring and disc-type electrodes 702 and 703. As is shown in FIGURE 7, upper layer 704 of the semiconductor device may be composed of weak n-type material, for example, appropriately doped silicon or germanium. Correspondingly, layer 705 of the semiconductor device may comprise relatively strong p-type material, for example, appropriately doped silicon or germanium. Activating substances such as arsenic, antimony, or other suitable electron donor material may be employed for doping the silicon or germanium so that the same may constitute an n-type semiconductor. Correspondingly, boron, aluminum, indium, or other suitable electron acceptor material may be employed as an activating substance for doping layer 705 so as to make it a p-type semiconductor. There are, of course, many ways for fusing electrodes 702 and 703 to their respective semiconductor layers. One way to perform this operation would be to deposit by an electroplating technique a suitable metallic substance upon the areas concerned, following this by dip-soldering the bonding surfaces, and then by heating the electrodes so as to fuse the same with the solder. There are also other methods extant for fusing electrodes to semiconductor material and bonding the same together in low ohmic contact. The particular type of bonding employed is arbitrary for the purposes of the present invention so long as sufficiently low ohmic contact of the electrodes to the semiconductor material is achieved. For purposes of clarity with respect to the present invention, the type of bonding employed is not illustrated in the figures.

The apparatus of FIGURE 8 is similar to that of FIGURE 7 with the exception that, this time, layer 704 constitutes a weak p-type of semiconductor material whereas layer 705 constitutes a strong n-type of semiconductor material. Whether the upper layer is of a weak p-type or of a weak n-type material is of little consequence. However, it is quite important to render the upper layer rather weakly doped with the activating substance chosen. The reason for this is to keep as wide as possible the latitude of operation of the device so that maximum variation between strong dielectric properties and strong metallic properties may be achieved. Again, current injection, as by the incorporation of a variable voltage source coupled to the electrodes of the semiconductor device will produce and may vary the hole-electron pair production in the of the p-n junction so as to achieve variable metallic characteristics of the semiconductor device. Hence, as is indicated in FIGURE 9, the amplitude and polarization characteristics of the reflected ray may be controlled by electrical or electronic means as is represented by voltage source 900 which may be made variable. Additionally, an analyzer such as a Nicol prism, plate pile, light-polarizing lens, or calcite crystal, may be employed to resolve the produced, reflected ray into utilizable components of light.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. An optical system for controllably altering the properties of a light beam, comprising, in combination, a light beam source, a body of semiconducting material having an optically polished surface oriented to receive from outside said body a beam of light from said source at an acute angle of incidence relative to said surface, and control means operatively associated with said body; said control means including a source of energy coupled to said body for altering the quantity of free charge carriers within the body near said surface thereof, whereby the light of the incident beam reflected from said surface is controllably modulated as to one of the factors in the group consisting of amplitude of a polarized component, preferential polarization azimuth, and polarization type.

2. An optical system in accordance with claim 1, in which said control means comprises a source of electric current connected to said body for altering the quantity of free charge carriers therein.

3. An optical system in accordance with claim 1, in which said control means comprises an auxiliary source of light arranged to irradiate said body for altering the quantity of free charge carriers therein.

References Cited in the file of this patent

UNITED STATES PATENTS

| | | |
|---|---|---|
| 2,330,171 | Rosenthal | Sept. 21, 1943 |
| 2,692,950 | Wallace | Oct. 26, 1954 |
| 2,692,952 | Briggs | Oct. 26, 1954 |
| 2,276,360 | Von Ardenne | Mar. 17, 1956 |
| 2,776,367 | Lehovec | Jan. 1, 1957 |

FOREIGN PATENTS

| | | |
|---|---|---|
| 741,154 | Great Britain | Nov. 30, 1955 |

OTHER REFERENCES

Jenkins and White: "Fundamentals of Optics," 2nd Ed., McGraw-Hill Book Co., New York, 1950, pages 486–487, 560–564 and 571–572.

Gibson: "Germanium Modulator for Infrared Communication," Electronics, pages 155–157, October 1954.

UNITED STATES PATENT OFFICE
CERTIFICATE OF CORRECTION

Patent No. 3,021,754            February 20, 1962

Bernd Ross

It is hereby certified that error appears in the above numbered patent requiring correction and that the said Letters Patent should read as corrected below.

Column 4, line 45, for "cruves" read -- curves --; column 7, line 18, for "the of the" read -- the region of the --.

Signed and sealed this 28th day of August 1962.

(SEAL)
Attest:

ESTON G. JOHNSON

Attesting Officer

DAVID L. LADD

Commissioner of Patents